United States Patent
Farivar et al.

(10) Patent No.: US 11,087,290 B2
(45) Date of Patent: Aug. 10, 2021

(54) TECHNIQUES TO IMPROVE A SCHEDULE WITH OPTIMIZATION

(71) Applicant: Capital One Services, LLC, McLean, VA (US)

(72) Inventors: Reza Farivar, McLean, VA (US); Vincent Pham, McLean, VA (US); Austin Grant Walters, McLean, VA (US); Jeremy Edward Goodsitt, McLean, VA (US); Fardin Abdi Taghi Abad, Champaign, IL (US); Mark Louis Watson, McLean, VA (US); Anh Truong, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 46 days.

(21) Appl. No.: 16/254,030

(22) Filed: Jan. 22, 2019

(65) Prior Publication Data
US 2020/0234250 A1 Jul. 23, 2020

(51) Int. Cl.
*G06Q 10/10* (2012.01)
*G06Q 10/06* (2012.01)
(Continued)

(52) U.S. Cl.
CPC ......... *G06Q 10/1095* (2013.01); *G06Q 10/02* (2013.01); *G06Q 10/06313* (2013.01); *G06Q 50/01* (2013.01)

(58) Field of Classification Search
None
See application file for complete search history.

(56) References Cited

U.S. PATENT DOCUMENTS

| 8,275,837 B1 * | 9/2012 | Alexander | G06Q 10/109 709/204 |
| 8,572,129 B1 * | 10/2013 | Lee | G06F 16/95 707/798 |

(Continued)

OTHER PUBLICATIONS

Enembreck, F., Barthes, J.A. "Distributed constraint optimization with MULBS: A case study on collaborative meeting scheduling." Journal of Network and Computer Applications, vol. 35, 2012, pp. 164-175. (Year: 2012).*

*Primary Examiner* — Jerry O'Connor
*Assistant Examiner* — Abhijit B Sadananda
(74) *Attorney, Agent, or Firm* — Kacvinsky Daisak Bluni PLLC

(57) ABSTRACT

Techniques to improve a schedule using optimization are described. Some described techniques improve the schedule using optimization upon a user's travel booking operation and/or in response to changes in the user's relationships. The techniques include an apparatus, a method, and a computer-readable medium configured to process relationship data associated with potential candidates for a set of meetings in a schedule, relationship data corresponding to interaction indicia with each potential candidate, generate, from the relationship data, a connectivity network comprising links with the potential candidates, each link of the links corresponding to a relevance value between a user and a specific potential candidate, and populate, via an optimization unit, open meeting spaces in the schedule with meeting data based upon the connectivity network and availability data of the potential candidates, the schedule being configured to substantially maximize relevancy of the set of meetings. Other embodiments are described and claimed.

17 Claims, 9 Drawing Sheets

(51) Int. Cl.
  *G06Q 50/00*    (2012.01)
  *G06Q 10/02*    (2012.01)

(56) References Cited

U.S. PATENT DOCUMENTS

| | | | | |
|---|---|---|---|---|
| 8,606,721 | B1* | 12/2013 | Dicker | G06Q 50/01 |
| | | | | 705/319 |
| 9,439,053 | B2 | 9/2016 | Abraham et al. | |
| 2005/0132004 | A1* | 6/2005 | Horvitz | G06Q 10/109 |
| | | | | 709/204 |
| 2009/0112677 | A1* | 4/2009 | Rhett | G06Q 10/109 |
| | | | | 705/7.21 |
| 2009/0165022 | A1* | 6/2009 | Madsen | G06Q 10/109 |
| | | | | 719/318 |
| 2011/0029887 | A1* | 2/2011 | Pearson | G06Q 10/10 |
| | | | | 715/743 |
| 2011/0184768 | A1* | 7/2011 | Norton | G06Q 10/02 |
| | | | | 705/5 |
| 2013/0254303 | A1* | 9/2013 | Cheng | H04L 51/32 |
| | | | | 709/206 |
| 2014/0012926 | A1* | 1/2014 | Narayanan | G06Q 50/01 |
| | | | | 709/206 |
| 2015/0204684 | A1* | 7/2015 | Rostamian | G06Q 10/101 |
| | | | | 701/537 |
| 2015/0248651 | A1* | 9/2015 | Akutagawa | G06Q 50/01 |
| | | | | 705/7.19 |
| 2016/0261544 | A1* | 9/2016 | Conover | H04L 51/32 |

\* cited by examiner

500

> PROCESS RELATIONSHIP DATA AND EVALUATE POTENTIAL CANDIDATES IN ACCORDANCE WITH RELEVANCE METRIC
> 502

> BUILD A CONNECTIVITY NETWORK BASED UPON RELEVANCY
> 504

> POPULATE OPEN MEETING SPACES IN A SCHEDULE WITH MEETING DATA
> 506

TECHNIQUES TO IMPROVE A SCHEDULE WITH OPTIMIZATION

BACKGROUND

In order for a business to operate properly, people must communicate effectively and work together as a cohesive unit; otherwise, most tasks will be incomplete and/or substandard. At least for this reason, companies invest in and/or produce their own technologies to increase employee productivity, for example, by way of enterprise applications (e.g., collaboration and productivity applications, such as word processing applications, e-mail applications, spreadsheet applications, unified communications systems and/or the like). Many enterprises today include associates located at distributed offices throughout the US and/or the world. Although collaboration tools have increased opportunities for digital interaction between individuals, suitable tools don't exist for facilitating in person interactions, which may be particularly challenging for associates traveling between office locations. These technologies provide several benefits of which better information is one. People, often when traveling, lack information about a new location, such as information about planned events at the new location, associates located at the new location, etc. Thus, opportunities for potentially valuable in-person collaboration or networking may be overlooked or missed.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to improve a schedule with optimization for local events or meetings and/or collaboration opportunities with other individuals determined to have a relevant relationship. Some embodiments are particularly directed to techniques to improve a schedule with optimization for situations when a person is in a new location, such as during a travel booking operation. In one embodiment, for example, an apparatus may comprise logic stored in the computer memory and executed on the processing circuit. The logic may be operative to cause the processing circuit to process relationship data associated with potential candidates for a set of meetings in a schedule where relationship data corresponds to interaction indicia with each potential candidate. The logic may be further operative to cause the processing circuit to generate, from the relationship data, a connectivity network comprising links with the potential candidates such that each link of the links corresponds to a relevance value between a user and a specific potential candidate. The logic may be operative to cause the processing circuit to populate or suggest, via an optimization mechanism, open meeting spaces in the schedule with meeting data based upon the connectivity network and availability data of the potential candidates. As a result, the schedule described herein is configured to substantially increase networking and collaboration opportunities and to maximize relevancy of the set of meetings. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a first logic flow for the system of FIG. 1.

DETAILED DESCRIPTION

Figure 1:
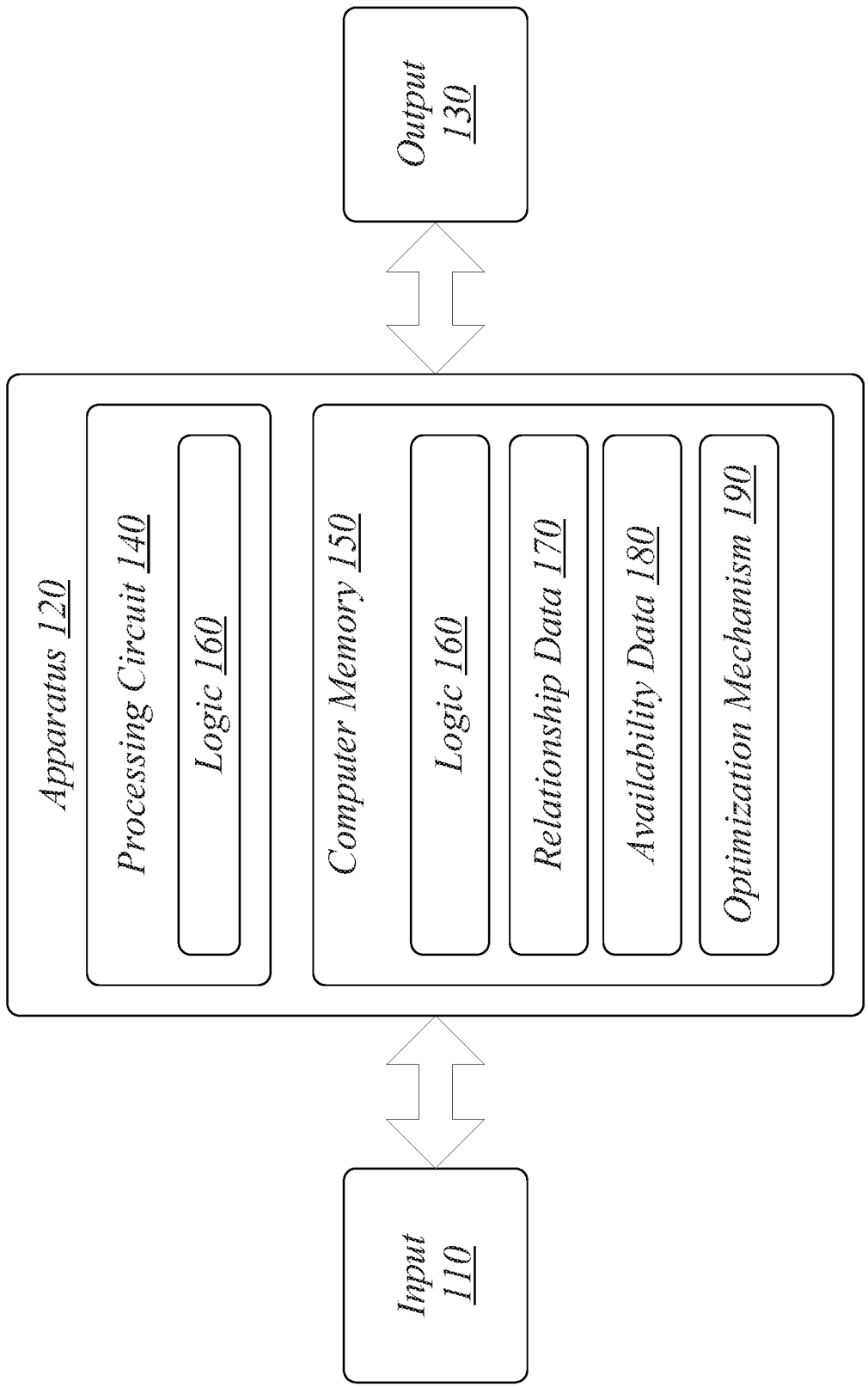
FIG. 1 illustrates an embodiment of a system to improve a schedule with optimization.

Various embodiments are directed to improve a schedule with optimization to further improve worker productivity, collaboration, and networking. If a person (e.g., when traveling) enters a new location, that person typically does not have enough information about the new location, including events of meetings scheduled at the new location, as well as identifying information of associated sitting at the new location. This insufficiency indicates that the person does not easily know of other relevant individuals with whom to schedule meetups or other potentially relevant meetings or events that may be of interest to the person. During the person's stay at the new location, for example, the person may be limited to a few meetings and an opportunity to build value and goodwill will be lost. By evaluating at least some information about the person's relationships/connections, at least some of the various embodiments of the present disclosure provide a technical solution that identifies a set of potential candidates at the new location with whom to schedule meetups or hold meetings. The various embodiments may proceed to improve the person's schedule by automatically recommending potential meetups and/or populating that schedule's open meeting spaces with actual meetings with relevant ones of the set of potential candidates. Some embodiments of the present disclosure perform such automatic recommendation or population upon or in response to a travel booking operation via an airline travel web application. The disclosed embodiments are also applicable to identifying networking opportunities upon request for any individual in a location, whether or the not the individual is travelling.

It should be appreciated that the relevancy of the above-mentioned potential candidates can be determined using any number of metrics, and candidates can be ranked according to their relevancy to the person booking travel. In one example embodiment, a potential candidate's relevancy—expressed as a numerical value—results from a heuristic function that receives, as input, relationship data corresponding to interactions between the person with the potential candidate. In another example embodiment, the potential candidate's relevancy is measured according to the above relationship data and project data corresponding to an organization's pending projects. Hence, the potential candidate's relevancy can be defined by the relationship data and, if needed, further refined by the project data such that the potential candidate's relevance value is adjusted according to the potential candidate's relevance to a pending project. To illustrate by way of example, in an organization where one potential candidate is an executive, there may be very few interactions between that candidate and a user; however, if the potential candidate must authorize the user's plans for the pending project, then that candidate's relevancy increases.

To achieve such an improvement, the various embodiments may rely upon an optimization mechanism, a logic unit or circuit capable of executing a combinatorial optimization technique, to identify an optimal or near optimal arrangement of meetings for the schedule. The optimal or near-optimal arrangement of meetings may maximize or substantially maximize relevancy with respect to that user. As mentioned herein, relevancy can be measured in any number of ways and one example refines relevancy as a relationship between a potential candidate and the person's project(s). Therefore, the near-optimal arrangement of meetings in the schedule may be configured to maximize (or substantially maximize) relevancy with respect to the person's project(s). It should be noted that the embodiments described in the present disclosure utilize various data to enable the optimization mechanism by effectively reducing a search space for the optimal or near-optimal arrangement of meetings in the schedule. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system having an apparatus 120 comprising one or more elements. Although the system 100 shown in FIG. 1 has a limited number of elements in a certain topology, it may be appreciated that the system 100 may include more or less elements in alternate topologies as desired for a given implementation.

The system 100 may comprise the apparatus 120. The apparatus 120 may be generally arranged to process input 110 and generate output 130 of which some of the output 130 may be configured for display on a display device. The apparatus 120 may include a processing circuit 140 and computer memory 150 on which logic 160 is stored and executed, respectively.

According to various embodiments, the logic 160 being operative to cause the processing circuit 140 to process relationship data 170 associated with potential candidates for a set of meetings in a schedule where the relationship data 170 corresponds to interaction indicia with each potential candidate. The logic 160 being further operative to cause the processing circuit 140 to generate, from the relationship data 170, a connectivity network that includes links with the potential candidates such that each link of the links corresponds to a relevance value between a user and a specific potential candidate. The logic 160 being further operative to cause the processing circuit 140 to populate, via an optimization mechanism 190, open meeting spaces in the schedule with meeting data based upon the connectivity network and availability data 180 of the potential candidates, the schedule being configured to substantially maximize relevancy of the set of meetings to the user.

In some embodiments, the availability data 180 may include data indicating an open time slot in each candidate's calendar and/or geographic location information of the candidate (which may be determined based on a person's usual location and/or travel information identified in the calendar). In some embodiments, the availability data 180 may also include data indicating events included in a candidate's calendar that may be relevant to a user, so the availability data 180 need not be limited to "open" calendar times. In some embodiments, the logic 160 being further operative to cause the processing circuit to access project data and adjust the connectivity network to account for relevancy to a particular project or set of projects.

The optimization mechanism 190 generally includes programmable logic and/or circuitry to execute an optimization technique, such as a combinatorial optimization technique. The optimization mechanism 190 may execute a modified combinational optimization technique that processes graph data comprising the connectivity network and the availability data 180 to determine an optimal or near-optimal arrangement of meetings. The connectivity network, being in graph data, may be processed with a reduced resource consumption. Furthermore, relevance values in the connectivity graph may represent heuristic values for the optimization technique and mitigate or eliminate a need for computing the heuristic values. The availability data 180 may further reduce the resource consumption and limit a search space for the optimal or near-optimal arrangement of meetings. In general, the availability data 180 refers to data identifying open and closed meeting spaces on schedules of the potential candidates in addition to or exclusive of data identifying the open meeting spaces in the schedule of the user.

The relationship data 170 generally refers to interactions between the user of the apparatus 120 and the potential candidates for meeting participants. These interactions may be external interactions (i.e., with devices in an external network) or internal interactions (i.e., with devices in an internal network). Some of these interactions may be social networking interactions through a social networking application, including email or messaging applications, contact lists. The interactions may be direct (e.g., direct communications) or indirect. By way of example, these indirect interactions may be inferred from common registration to a team channel or a topic channel, following of a topic, membership to an email thread, communications through an intermediate, forwarded emails, an email alias, and/or the like. In some embodiments, these interactions may be harvested from enterprise tools. As described herein, the logic 160 or other logic in the apparatus 120 may mine the input 110 and the output 130 to identify the above-mentioned interactions and generate the relationship data 170. The logic 160 may process the relationship data 170 corresponding to the above-mentioned interactions and identify various indicia (e.g., attributes) of relevancy. The logic 160 may further process the relationship data 170 in accordance with a relevance metric to determine relevancy of a potential candidate to the user.

The relevance metric refers to some functionality capable of measuring an aspect of relevance. It is appreciated that the relevance metric, as described herein, may measure any aspect of relevance; for example, one relevance metric may measure topic/project relevance while another relevance metric may measure connectedness relevance. Topic/project relevance may refer to a measurement as to how many topic/projects the user and the potential candidate share, whereas connectedness relevance may refer to a measurement as to how often the user and the potential candidate communicate/interact. The relevance metric described herein may be applied to the relationship data 170 to determine how relevant is a potential candidate to the user; the relevancy of which can be defined in generality or in a specific respect. For example, the relevance metric may determine how relevant is the potential candidate to the user with respect to the user's work life or the user's social life. The relevance metric may be used to define relevancy for a specific aspect of the user's work life, such as for a particular project.

In some embodiments, the optimization mechanism 190 provides the optimal or near-optimal arrangement by framing—as an optimization problem such as the bin-packing problem or the knapsack problem—the automatic population of the schedule as described herein for the logic 160. In the bin packing problem, objects of different volumes must be packed into a finite number of bins or containers each of volume (V) in a way that minimizes the number of bins used. When the number of bins is restricted to one (1) and each item is characterized by both a volume and a value, the problem of maximizing the value of items that can fit in the bin is known as the knapsack problem. In the knapsack problem, given a set of items, each with a weight and a value, determine the number of each item to include in a collection so that the total weight is less than or equal to a given limit and the total value is as large as possible. The automatic recommendation or population of the open meeting spaces in the schedule with meeting data as described herein can be enabled by considering the schedule to be a bin and each item to be a potential meeting with a potential candidate in the connectivity network.

An alternative embodiment of the optimization mechanism 190 considers each 30-minute open meeting space as a single bin, and a set of half-hour open meeting spaces as a set of bins in a bin-packing problem. Similarly, the list of available people that are at the same physical location are possible items that may be distributed across the bins. From this point on, any number of well-known bin-packing solutions can be effectively used to distribute the meeting items onto the meeting space bins. Examples of these solutions include first-fit decreasing or best-fit decreasing algorithms. Other solutions can be used for better fitting/faster runtimes without changing the optimization mechanism 190.

Despite the fact that the bin packing problem/knapsack problem has an NP-hard computational complexity, the above-mentioned optimal or near-optimal arrangement can be identified with certain techniques of which some employ suitable approximation algorithms or heuristics. As one example technique, the first fit algorithm provides a fast but often non-optimal solution, involving placing each item into the first bin in which it will fit. The algorithm can be made much more effective by first sorting the list of elements into decreasing order (sometimes known as the first-fit decreasing algorithm). It is known, however, that there always exists at least one ordering of items that allows first-fit to produce an optimal solution.

The design of suitable heuristics or approximation algorithms for combinatorial optimization may require significant specialized knowledge and trial-and-error. Other embodiments exploit the fact that the same problem structure is maintained between goal of finding the optimal arrangement and a known combinatorial optimization problem. This provides an opportunity for learning heuristic algorithms that exploit the structure of such recurring problems. Embodiments described in the present disclosure can be applied to a diverse range of optimization problems with underlying structures in graph data. Some embodiments may further improve the automatic population of the schedule by invoking a machine learning technique to learn effective algorithms and/or heuristics.

Figure 2:
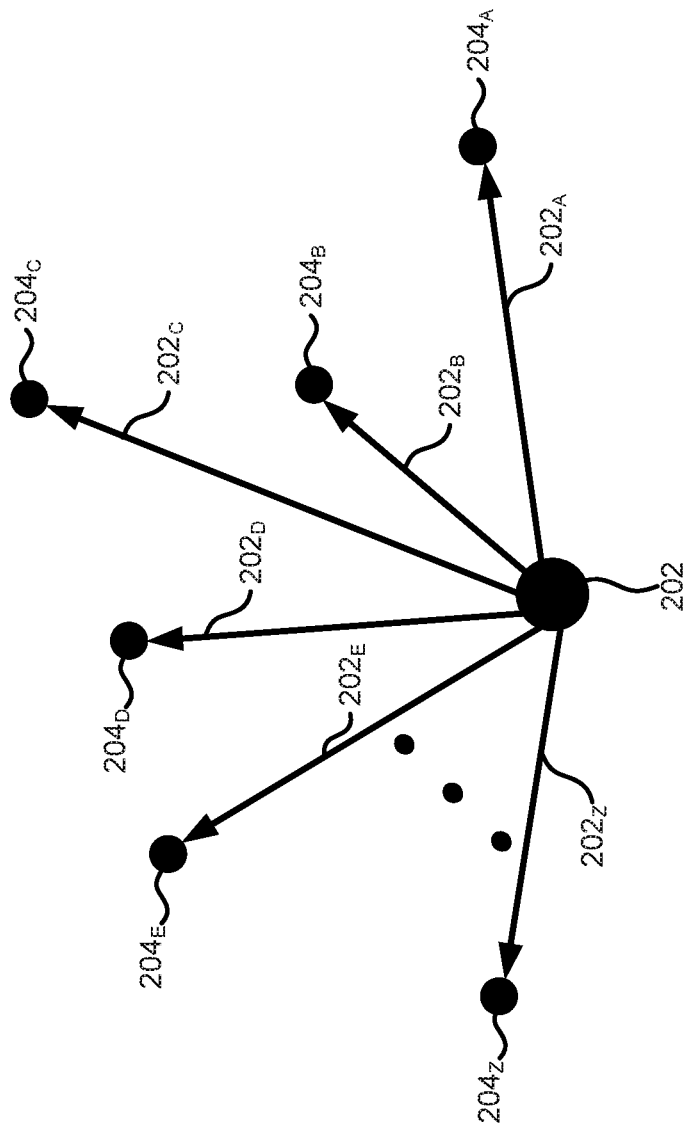
FIG. 2 illustrates an embodiment of a connectivity network for the system of FIG. 1.

FIG. 2 illustrates an embodiment of a connectivity network 200 for the system 100. As shown in FIG. 2, the connectivity network 200 has root node 202 representing a user with links 204 to nodes 206 representing potential candidates for meetings. As described herein, the system 100 evaluates relationship data (e.g., the relationship data 170 of FIG. 1) between the potential candidates and the user in accordance with a relevance metric and generates the connectivity network 200 such that a link 2041 to a node 2061 corresponds with a value indicating relevancy to the user of the person represented by the node 2061. The relationship data generally includes external network interactions (e.g., social network interactions between the user and the potential candidates via social networking platform) and internal network interactions (e.g., work-related interactions between the user and the potential candidates as employees in a same organization). The relationship data also identifies potential candidates who may be more than one degree of separation away from the user.

In some embodiments, the relationship data can be modeled such that each type of interaction is an attribute with at least one value and at least one weight. Each value/weight may be based upon certain nuances; for example, an attribute's weight may be based upon that type of interaction's importance with respect to the other attributes. The system 100 may train a machine learning model by assigning values to data points representing interactions between the user and a potential candidate and compute a combined value representing a relevance of the user's relationship with the potential candidate.

The system 100 may infer the relationship data in a variety of ways. In one embodiment, the system 100 may infer the relationship data from enrollment into a specific group, such as a group in a collaboration or communication tool. The user and one or more potential candidates may share membership to a specific channel of a cloud-based collaboration application and platform (e.g., SLACK®). In another embodiment, the system 100 may infer the relationship data from common membership in a same email domain, a same email thread, and/or a same email alias; each having a different weight assigned by the system 100. The system 100 may assign weights based on an extent to which potential candidates have directly communicated via email, commented on a same topic, and/or the like. A weight may be adjusted, for example, based on frequency of communication on a topic.

By performing a weighted analysis of the relationship data, the system 100 generates relevance values between the user and the potential candidates. These relevance values can be used to construct the connectivity network 200. Each relevance value generally characterizes a relationship between the user and a potential candidate. With respect to FIG. 2, the present disclosure expresses differences in relevance values as differences in length of the links 204. To illustrate by way of example, if the user and the potential candidate frequently communicate directly via email, the system 100 invokes a metric to compute a relevance value representing such frequent communications. If, on the other hand, the user and the potential candidate rarely communicate via email, the same metric may provide a considerably lower relevance value. The metric may be applied to additional types of interactions and is limited to measuring email communications. The metric may be applied to measuring indirect network interactions for computing relevance values, such as when the user and a potential candidate have more than one degree of separation.

When the system 100 combines the connectivity network 200 with availability data (e.g., the availability data 180 of FIG. 1) corresponding to both the potential candidates and the user, the system 100 determines an optimal (or near-optimal) arrangement of meetings for insertion into open meeting spaces of the user's schedule. The arrangement of meetings may be considered optimal (or near-optimal) if such an arrangement maximizes (or substantially maximizes) relevancy to the user in some respect. Some example embodiments implement the connectivity network 200 such that the resulting user schedule is configured to maximize (or substantially maximize) relevancy to the user with respect to their relationship to each other. It is appreciated that the relationship data between the user and the potential candidates can be evaluated using any number of metrics.

The connectivity network 200 can be adapted to any model by adjusting the relevance values. For example, embodiments of the present disclosure utilize different sets of attributes and/or different functions to compute multiple sets of relevance values of which one set may be used for one purpose and another set may be configured for another purpose.

Figure 3:
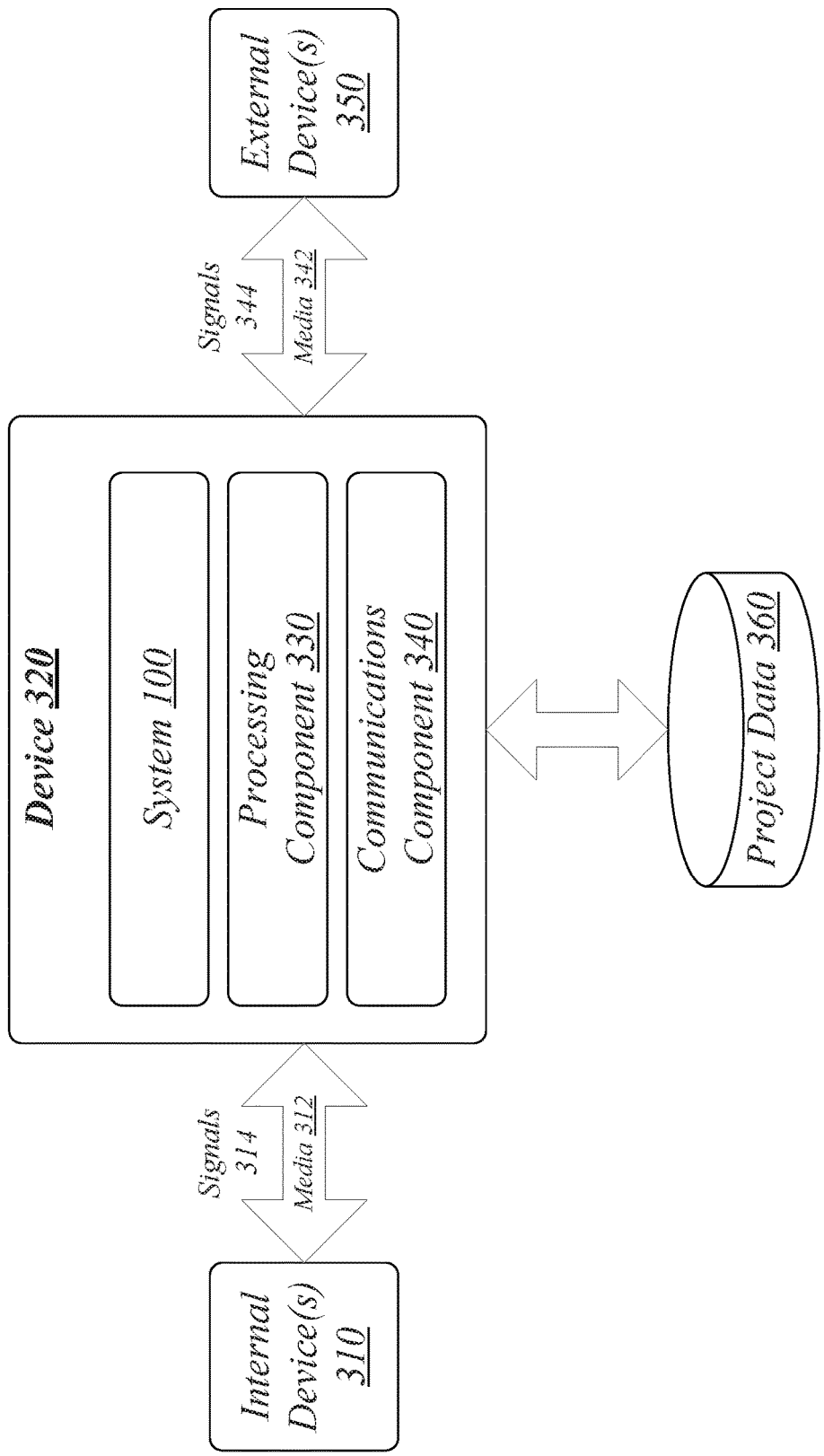
FIG. 3 illustrates an embodiment of an operating environment for the system of FIG. 1.

FIG. 3 illustrates a block diagram of an embodiment of an operating environment 300 for the system 100. The operating environment 300 may be in the form of a centralized system implementing some or all of the structure and/or operations for the system 100 in a single computing entity, such as entirely within a single device 320. As shown in FIG. 3, the operating environment 300 includes the device 320 connected to one or more internal devices 310 and one or more external devices 350.

The device 320 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 320 may execute processing operations or logic for the system 100 using a processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312, 342 include wired communications media and wireless communications media. The communication media 312, 342 can be distinguished from a storage medium such as the computer memory 150 of FIG. 1. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 320 may communicate with other devices 310, 350 over a communications media 312, 342, respectively, using communications signals 314, 344, respectively, via the communications component 340. The devices 310, 350 are internal or external to the device 320, respectively, as desired for a given implementation. In general, the internal device(s) 310 and/or the external device(s) 350 may be the same or similar to the device 320 or the apparatus 120 as described with reference to FIG. 1. For instance, the internal device(s) 310 and/or the external device(s) 350 may each comprise a processing component 330 and a communications component 340 which are the same or similar to the processing component 330 and the communications component 340, respectively.

In some embodiments, the logic 160 of FIG. 1 may generate the relationship data 170 of FIG. 1 by examining communications/interactions between the device 320 and the internal device(s) 310 and/or the external device(s) 350. The logic 160 of FIG. 1 may store information corresponding to these communications/interactions and, from this information, may identify attributes and attribute values using a relevance metric as described herein. As an example, the device 320 and the internal device(s) 310 form part of an internal network (e.g., a campus-wide or company-wide enterprise network) through which the device 320 and/or the internal device(s) 310 exchange messages and data, generate/collaborate on documents, and otherwise interact/connect with each other. The device 320 and the external device(s) 350 form part of an external network (e.g., a social network) through which various applications exchange messages and data (e.g., videos, photos, and/or the like), generate/collaborate on documents (e.g., creative works), and otherwise interact/connect with each other. Often, the user, via the device 320, communicates with a same person via both the external network and the internal network; the person may have multiple devices with at least one internal device 310 and at least one external device 350. The relationship data, as described herein, records these interactions/connections for evaluation by some metric (i.e., a relevance metric).

One example relevance metric evaluates the relationship data to determine how relevant, in general, a potential meeting participant is to the user. The present disclosure envisions a number of applicable metrics of which some are configured to evaluate relevancy in at least one respect. The relevance metric is configured to produce a relevance value indicating such relevancy. The relevance metric can be adjusted or configured such that those who are relevant to the user in a particular respect will have higher relevance value than those who are not relevant in the particular respect or who are relevant in other respects. For example, the relevance metric may score external network interactions/connections higher than internal network interactions/connections to identify people who are relevant to the user's home/social life; vice versa, the relevance metric may score internal network interactions/connections higher than external network interactions/connections to identify people who are relevant to the user's work life. As another example, if the relevance metric is configured to assign a value only to people who communicate with the device 320 through the user's work email address, the system 100 can easily determine which potential candidates are relevant to the user's work and should be considered for a meeting.

As described herein, some embodiments utilize project data 360—which may include a database of pending project information or other information from which project participation can be inferred including records of access privileges, organization hierarchical information, and/or the like—to augment the relationship data in determining relevancy of the potential candidate as a meeting participant. Depending on the relevance metric, the system 100 adjusts the relevance values to incorporate into the relevance calculation the project data 360. As an example, the relevance metric may assign higher attribute values to or define new attributes for interactions/connections pertaining to one of the user's projects. As a result, the system 100 may compute a higher relevance value for a potential candidate involved in one of the user's projects than another potential candidate even through the other potential candidate may communicate/interact with the user more frequently.

Figure 4:
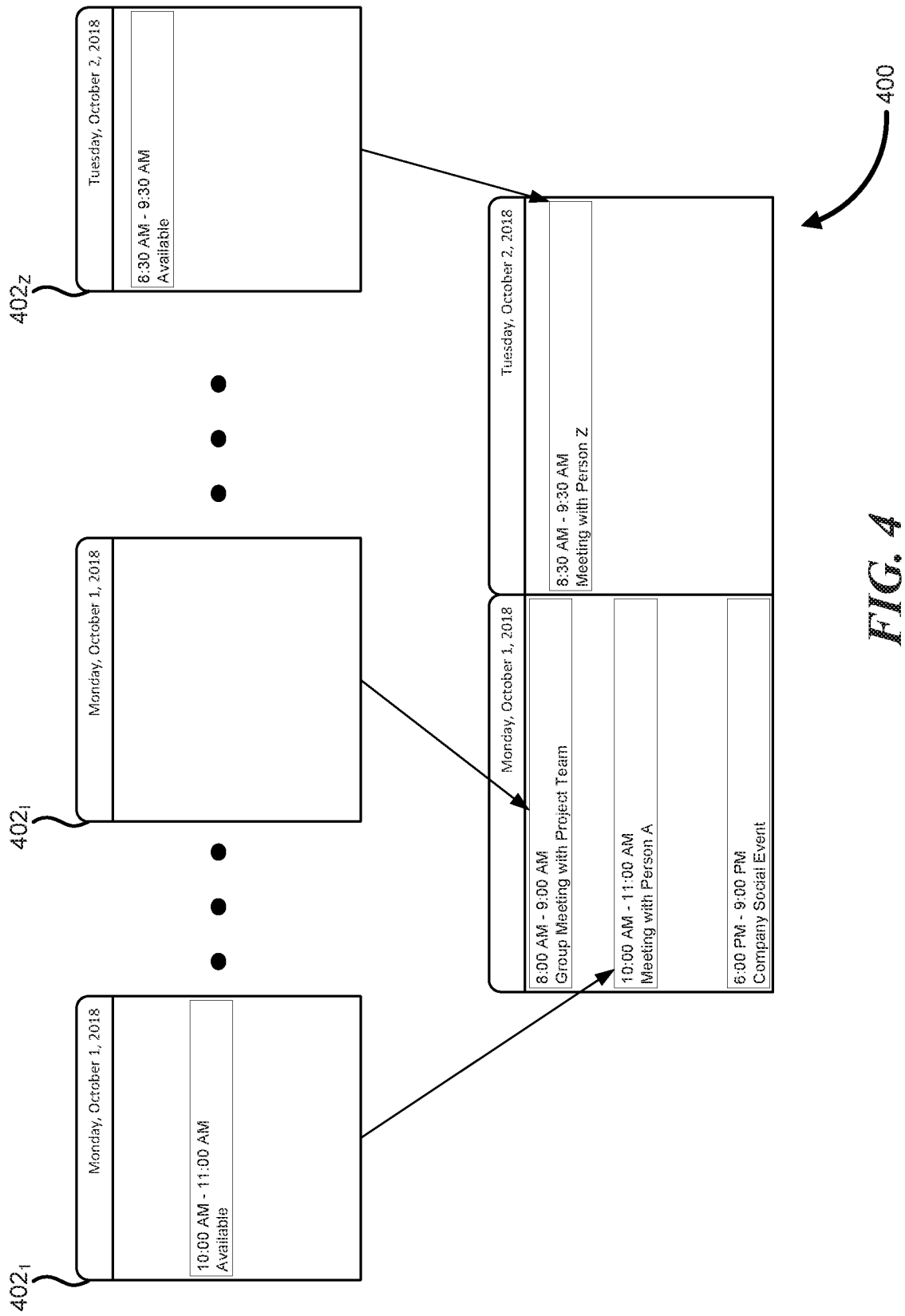
FIG. 4 illustrates an embodiment of a schedule in accordance with the system of FIG. 1.

FIG. 4 illustrates an embodiment of a schedule 400 for the system 100. As shown in FIG. 4, the schedule 400 includes open meeting slots into which the system 100 recommends or populates with meetings for a user. FIG. 4 further illustrates corresponding schedules 402 with open and closed meeting slots for potential candidates for meeting participants. In both the schedule 400 and the corresponding schedules 402, the open meeting slots express availability data for either the user or the potential candidates for meeting participants.

Regarding the corresponding schedules 402, the closed meeting slots may express availability data for the potential candidates, such as when a closed meeting slot is relevant to the user. As described below, the closed meeting slot may indicate a social event on company campus; that social event will provide a rare opportunity for the user to get to know the potential candidates without work getting in the way. As an example, the closed meeting slot may indicate a group meeting that is relevant towards completing the user's current project. The user may desire to join this meeting by requesting an invitation. As another example, the closed meeting slot may indicate an informational seminar/presentation where colleagues from different parts of an organization gather to learn and/or brainstorm. A list of closed meeting slots may be inferred from the corresponding schedules 402 and/or from other sources (e.g., general open invitations or lists).

Based upon the availability data for those potential candidates and a connectivity network representing relationships between the user and the potential candidates, the system 100 may determine an arrangement of meetings such that the resulting schedule 400 maximizes relevance to the user as described in the present disclosure. Once the above arrangement of meeting is determined, the system 100 inserts information into at least some of the open meeting spaces of the schedule 400 and at least some of the corresponding schedules 402, setting meeting data to establish meetings (e.g., calendar events) between the user and at least some of the potential candidates.

As a result, the schedule 400 being illustrated in FIG. 4 includes an arrangement of meetings set for eight (8) am to nine (9) am, ten (10) am to eleven (11) am, and six (6) pm to nine (9) pm on Monday and eight-thirty (8:30) am to nine-thirty (9:30) am on Tuesday. A first meeting of the arrangement occurs from eight (8) am to nine (9) am on Monday as a group meeting with the project team. Scheduling the first meeting involves at least coordinating contemporaneous open meeting spaces amongst multiple meeting participant schedules from the corresponding schedules 402. A second meeting of the arrangement, a face-to-face meeting with Person A, occurs on Monday, Oct. 1, 2018, from ten (10) am to eleven (11) am. A third meeting of the arrangement is a company social event held from six (6) pm to nine (9) pm, Oct. 1, 2018. The system 100 automatically adds the user to the social event (e.g., via an automatic reply e-mail message to an invitation). A fourth meeting of the arrangement, a virtual or on-line meeting with Person Z, occurs from eight-thirty (8:30) pm to nine-thirty (9:30) am, Oct. 2, 2018.

The first, second, and fourth meetings are scheduled for open meeting slots between the contemporaneous corresponding schedules 402 and the user's schedule 400. The third meeting of the arrangement is established for a closed meeting slot between the contemporaneous corresponding schedules 402 and the user's schedule 400. Multiple connected persons may have the company social event on their corresponding schedules 402. Alternatively, the company social event may be listed as a campus event on everyone's corresponding schedules 402.

In some embodiments, the system 100 allows for sending recommendations to the user informing that user of potential meetups, group meetings, social events, seminars, and/or the like. The recommendation may include an invitation to the potential meetups, group meetings, social events, seminars, and/or the like. The user, after reviewing the recommendation, may select one or more invitations to accept. Each invitation or the recommendation could include information indicating the relevant factors used in making the connection, for example, there is an opportunity to connect with Jim Beam, which we think you might find interesting because you both subscribe to the Whiskey Club messaging channel and both have indicated affinity for Kentucky Bourbon. In addition to or as an alternative, the invitation or recommendation may indicate that both the user and the recommended meeting participant are on a same Data Transformation email alias at the same company, indicating that both may be working on similar solutions. In some embodiments, the recommendation could include scripted code operative to auto-generate a meeting invite to send to Jim Beam with some pre-generated message content.

The system 100 may incorporate feedback into the identification of potential candidates for meeting participants. The above-mentioned recommendation may include a mechanism (e.g., a selection box) that allows the user to provide feedback, such as to remove people on the Whiskey Club messaging channel from consideration as potential meeting participants. Other types of feedback may be to select time slots to schedule a meeting or to select certain potential candidates to consider over others. For example, the user may enter (e.g., via a selection dialog box) instructions directing the system 100 to prioritize people from the Whiskey Club messaging channel as potential candidates for meeting; to reflect such prioritization, the system 100 increases the relevance values for those on the Whiskey Club messaging channel. The user may also enter instructions directing the system 100 to prioritize or restrict specific time slots for meetings such that relevance values are increased for potential candidates who have availability during the specific time slots; for example, the system 100 may establish meetings for the user's schedule 400 only between two (2) to four (4) pm. As another example, the user may instruct the system 100 to schedule meetings with project managers working on Artificial Intelligence-related projects; as a result, the system 100 selects meeting participants from the corresponding schedules 402 of those project managers.

While it is appreciated that additional meeting spaces could have been populated with additional meeting data but that would render non-optimal the resulting arrangement of meetings. As one reason, the additional meeting data may be extraneous and/or unnecessary and thus, would not help substantially maximize a relevancy of the entire arrangement of meetings. Extraneous and/or unnecessary meetings do not further a goal (e.g., a project) and can waste resources for the meeting participants. In fact, an extraneous or unnecessary meeting may provide only a nominal value but incur an overall cost (e.g., in terms of time, expense, and lost opportunity) that outweighs the nominal value in return. Therefore, the system 100 may set a minimum threshold relevance value for the optimal arrangement of meetings. Once a sum of relevance values from the above four meetings reaches the minimum threshold, the system 100 outputs the schedule 400.

Included herein is a set of flow charts representative of exemplary methodologies for performing novel aspects of the disclosed architecture. While, for purposes of simplicity of explanation and by example, the one or more methodologies are shown and described as a series of acts in the form of a flow chart or flow diagram, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes relationship data associated with potential candidates for meeting participants and evaluates these potential candidates in accordance with a relevance metric at block 502. The relevance metric, generally, refers to a technique for measuring various interaction indicia between a potential candidate and a user into attributes (e.g., attribute values) and then, combining the attributes into a value or score representing relevancy of that potential candidate to the user (i.e., a relevance value). For example, the logic flow 500 may identify, from relationship data (e.g., the relationship data 170 of FIG. 1), attribute values and score these relevance values in accordance with the relevance metric. The logic flow 500 may adjust these values with project data by determining attribute values for potential candidates for meeting participants based upon same or similar projects and aggregate the relevance values with the above attribute values into aggregated relevance values.

The logic flow 500 may build a connectivity network based upon relevancy at block 504. For example, the logic flow 500 may generate the connectivity network 200 of FIG. 2 by linking the user to each potential candidate and then, assign a relevance value to each link. As illustrated in FIG. 2, the connectivity network 200 may use length to distinguish links of different relevance values. In some embodiments, the connectivity network 200 need not be graphical but may include a listing of potential candidates and one or more relevance values.

The logic flow 500 may populate open meeting spaces in a schedule with meeting data at block 506. For example, the logic flow 500 may access the availability data 180 of FIG. 1 from the user's schedule and corresponding schedules of the potential candidates, combine the availability data and the connectivity network, and, via an optimization mechanism executing a combinatorial optimization technique, determine an optimal arrangement of meetings to insert into the user's schedule in at least some of the open meeting spaces. The present disclosure describes some embodiments of the optimal (or near-optimal) arrangement of meetings in the user's schedule as being configured to maximize (or substantially maximize) the relevancy—as measured through the relevance values—between the user and the set of the potential candidates. The availability data generally refers to time and date information of the open meeting spaces in both the user's schedule and the corresponding schedules of the potential candidates and is operative to reduce a search space of the optimal arrangement to a management one, enabling the execution of the optimization technique. The connectivity network, providing the relevance values, further enables the optimization technique by providing a management structure for the relevance values. The connectivity network as described herein may improve the optimization technique over other structures including other networks or graph data. The embodiments are not limited to this example.

Figure 6:
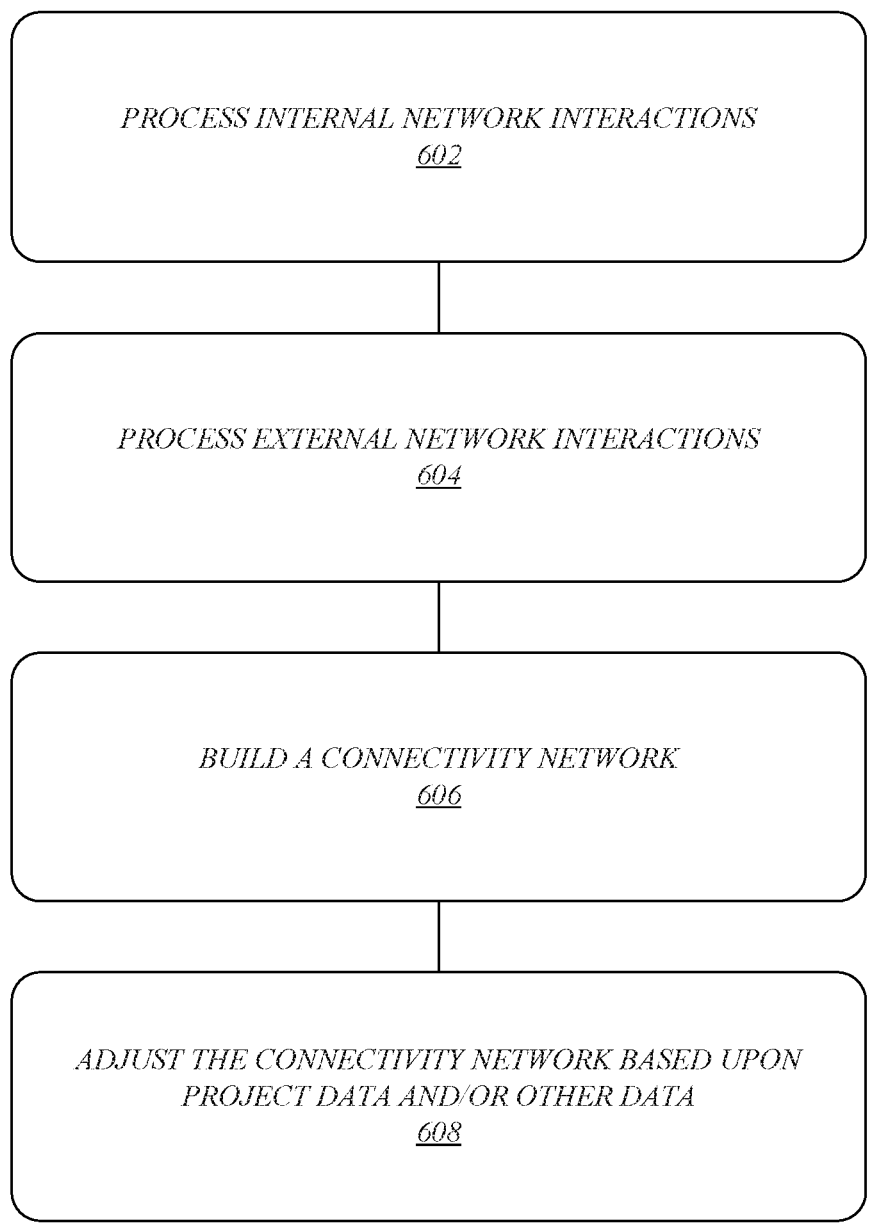
FIG. 6 illustrates an embodiment of a second logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may process internal network interactions at block 602. For example, the logic flow 600 may process communications between a user's device(s) and devices in at least one internal network. The logic flow 600 may process external network interactions at block 604. For example, the logic flow 600 may process communications between the user's device(s) and devices in at least one external network.

The logic flow 600 may build a connectivity network at block 606. For example, the logic flow 600 may build the connectivity network 200 of FIG. 2 where each link represents a relevance value. Using different metrics (e.g., relevance metrics) results in different connectivity networks indicating different levels of interaction between the user and the potential candidates. It is appreciated that the logic flow 600 may build other connectivity networks using various techniques such that the links may represent other values. As described herein, the logic flow 600 may generate the connectivity network to reflect topic relevance or connectedness relevance between the user and the potential candidates.

The logic flow 600 may adjust the connectivity network based upon project data and/or other data at block 608. For example, the logic flow 600 may adjust graph data underlying the connectivity network 200 by modifying one or more of the values defining links between the user and potential candidates. At least part of the project data corresponds to one or more pending company projects by the user and, as such, a potential candidate who also shares a project is very relevant to the user. Accordingly, a link's value indicating very few interactions between the user and the potential candidate may increase and may also exceed other values defining relationships with a significant amount of interactions. This may be the case if the potential candidate is an executive and thus, would have very few interactions with the user but would be relevant to a pending project. In addition to the potential candidate's importance in the company and/or to the project, the logic flow 600 may increase the value for the potential candidate in the connectivity network if the potential candidate is required for a task. In addition, the logic flow 600 may adjust the connectivity network in response to changes in the relationship data between the user and the potential candidates. The embodiments are not limited to this example.

Figure 7:
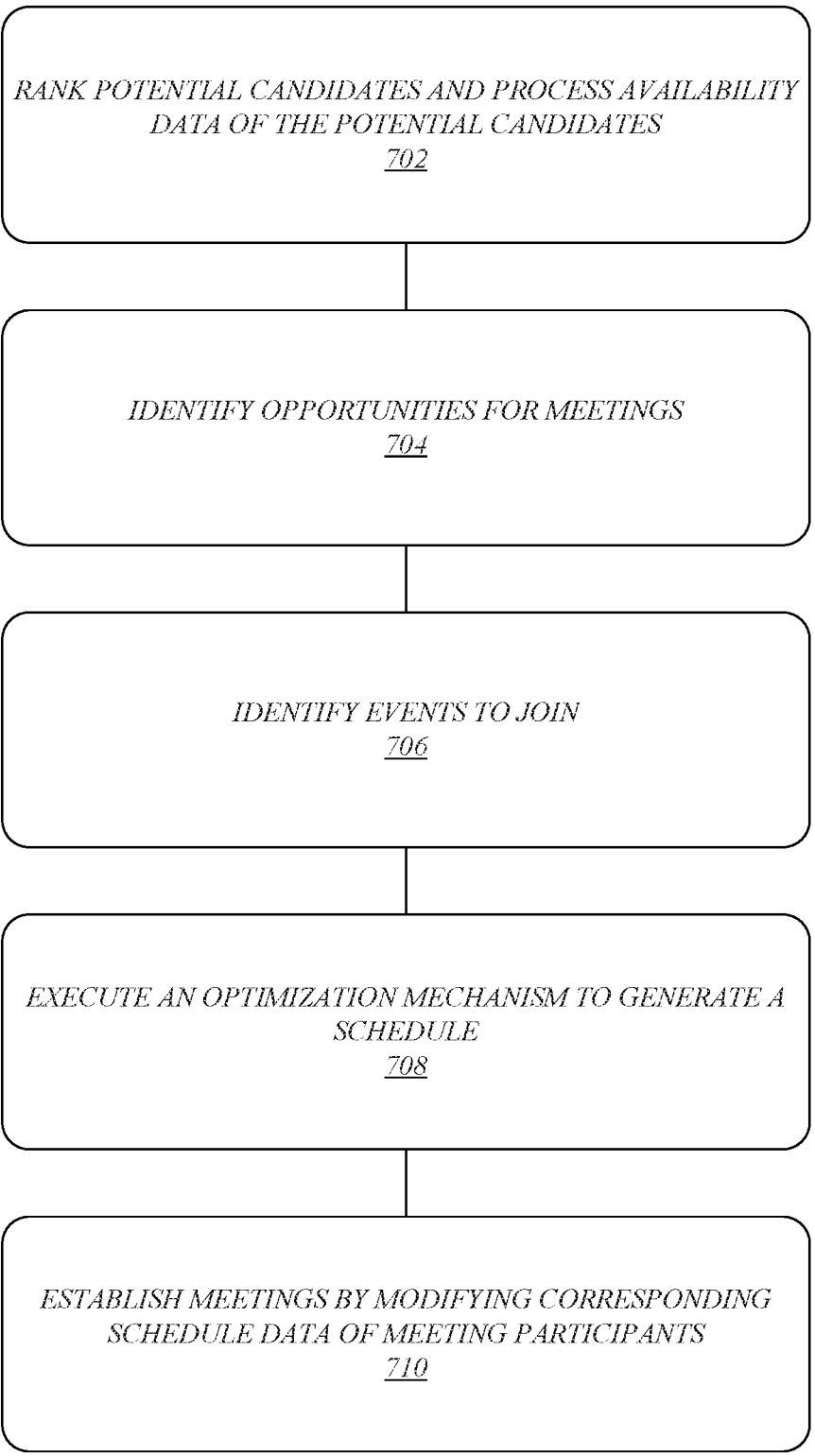
FIG. 7 illustrates an embodiment of a third logic flow for the system of FIG. 1.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 ranks potential candidates and process availability data of the potential candidates at block 702. For example, the logic flow 700 may rely on relevance values to rank employees at a new location and build a connectivity network (e.g., the connectivity network 200 of FIG. 2) for a user. It is appreciated that the logic flow 700 may execute at any time and may be effective during a travel booking operation to the new location and/or in response to changes in relationship data (e.g., the relationship data 170 of FIG. 1). The travel booking operation would be any electronic booking operation for travel to the new location, such as through a commercial web site on the Internet.

The logic flow 700 may identify opportunities for meetings at block 704. For example, the logic flow 700 may identify opportunities for face-to-face meetings, virtual meetings, group meetings, and/or the like by examining meeting data in the user's schedule and corresponding schedules of the employees at the new location. An open meeting space shared between the user's schedule and at least one of the corresponding schedules may constitute such an opportunity.

The logic flow 700 may identify events to join at block 706. For example, the logic flow 700 may identify existing meetings or social events at the new location to add to the user's schedule while performing the travel booking operation to the new location. If there is open space in the user's schedule for a particular social event, for instance, the logic flow 700 inserts information of the particular social event into the open space.

The logic flow 700 may execute an optimization mechanism to generate a schedule at block 708. For example, the logic flow 700, invoking the optimization mechanism 190 of FIG. 1, may execute a combinatorial optimization technique to determine an optimal arrangement of meetings to add to the user's schedule and/or the corresponding schedules of the potential candidates. As described herein, the combinatorial optimization technique is enabled by inputs comprising availability data corresponding to the above-mentioned open space in the user's schedule and/or the corresponding schedules and values comprising the connectivity network.

The logic flow 700 may establish meetings by modifying corresponding schedule data of meeting participants at block 710. For example, the logic flow 700 may establish these meetings for potential candidates/device owners in an internal network where the potential candidates/device owners utilize one or more enterprise applications for meetings and to communicate with each other. As described herein, these enterprise applications include a calendar application, an email application, collaboration tools, and/or the like. At least one application establishes meetings and manages a schedule for the user and, more importantly, provides an Application Programming Interface (API). The logic flow 700 may communicate a request or a control directive invoking a function of the API to establish a meeting. The logic flow 700 may communicate the request or the control directive to insert appropriate information into a schedule of a meeting participant and such meeting data effectively creates a meeting between the user and the meeting participant.

The logic flow 700 may be executed based upon travel slots being assigned in the user's schedule (e.g., calendar). Before the user is scheduled for travel to a travel destination, the logic flow 700 executes and ranks, according to relevance values, potential meeting participants at the travel destination. In some embodiments, the logic flow 700 may send a notification to inform a potential meeting participant that the user is travelling to their office location next week and has some availability at a particular time slot (e.g., ten (10) am on Monday, Oct. 1, 2018). The notification may be an email message with an HTML element configured to connect the user with the potential meeting participant. When the HTML element is activated (e.g., via a touch command), the logic flow 700 instructs the user's calendar application and the potential meeting participant's calendar application to add a meeting at the particular time slot, for example, by instructing each calendar application's API to insert meeting data into either the user's schedule or the potential meeting participant's schedule.

In some alternative embodiments, the logic flow 700 may be executed for a user at a physical location to which potential meeting participants are traveling. The logic flow 700 may rank the potential meeting participants according to relevance values. In addition to interaction indicia, the logic flow 700 may define attributes and attribute values for configurable user preferences and/or feedback. Via the logic flow 700, for example, the user may configure (e.g., in a profile) the system 100 to try to schedule meetings with data scientists or design people when they happen to be coming to the user's home office location—regardless of whether or not the user previously interacted with any of them. The embodiments are not limited to this example.

Figure 8:
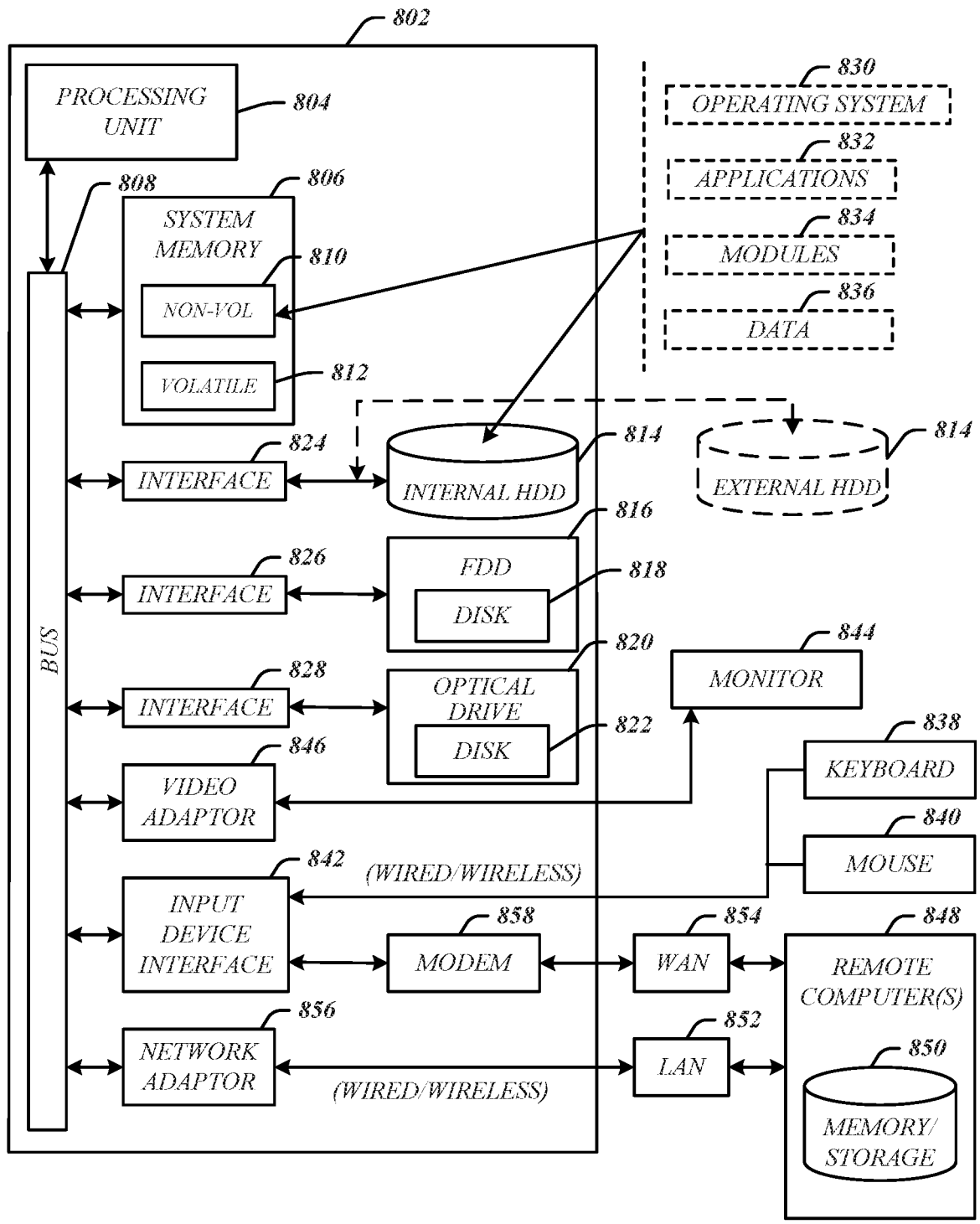
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
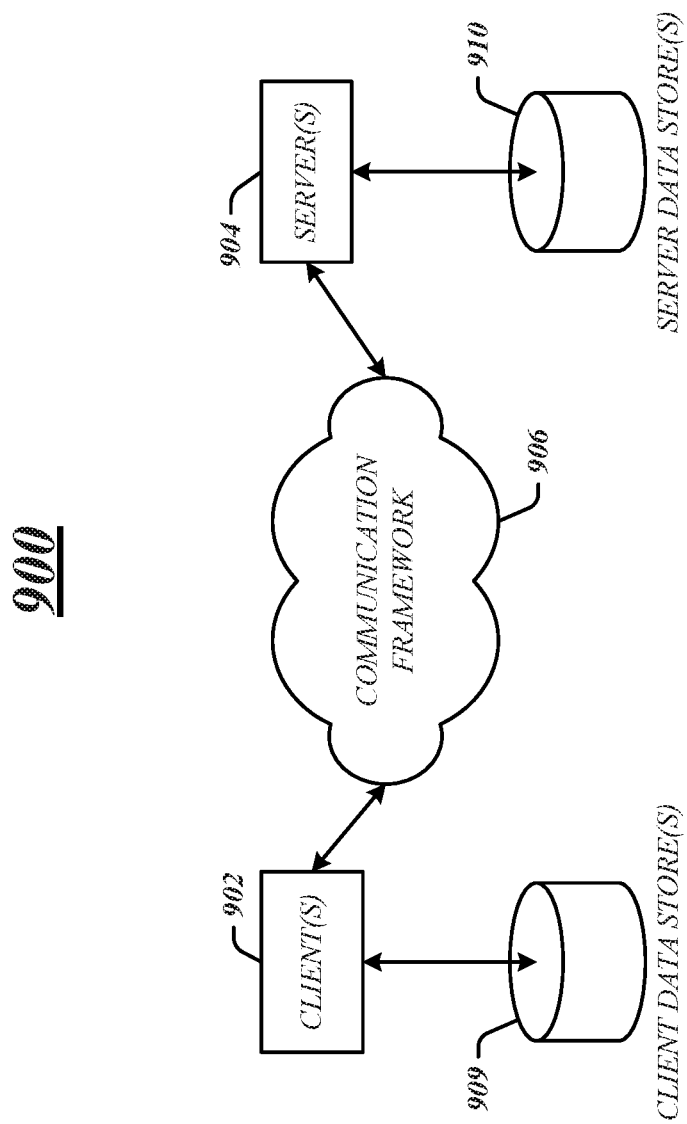
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
computer memory;
a processing circuit; and
logic stored in the computer memory and executed on the processing circuit, the logic operative to cause the processing circuit to:
receive, via mining an input and an output of a device of a user coupled with one or more networking connections coupled to one or more internal networks and one or more external networks, communications conducted between the device of the user and devices associated with potential candidates, the communications comprising interaction indications between the user and the potential candidates for one or more meetings in a schedule, wherein the interaction indications include:

indirect interactions from communications between the device of the user and external devices communicated on the one or more external networks, and direct interactions from communications between the device of the user and internal devices communicated on the one or more internal networks;

process the interaction indications to generate relationship data associated with the potential candidates for the one or more meetings in the schedule;

generate, from the relationship data, a connectivity network comprising links with the potential candidates, each link of the links corresponding to a relevance value between the user and a specific potential candidate, and wherein each relevance value represents a relationship between the user and the specific potential candidate;

perform a combinatorial optimization technique on the connectivity network and availability data of the potential candidates to determine meeting data comprising an arrangement of meetings increasing relevancy of the schedule, the availability data being operative to reduce a search space for the arrangement of meetings to open meeting spaces of the user, the connectivity network configured as a structure for the relevance values, and the relevance values utilized as heuristic values for the combinatorial optimization technique; and communicate a control directive to an application programming interface (API) of an enterprise application to populate open meeting spaces in the schedule with the meeting data.

2. The apparatus of claim 1 further comprising logic configured to cause the processing circuit to:

retrieve project data from a database, the project data comprising pending project information, project participation information, or a combination thereof;

process the project data and generate the connectivity network based upon the project data; and populate the schedule with the meeting data to maximize a relevancy of a set of meetings with respect to the project data.

3. The apparatus of claim 2 further comprising logic configured to cause the processing circuit to identify a potential candidate as a meeting participant based upon the project data.

4. The apparatus of claim 2 further comprising logic configured to cause the processing circuit to identify an opportunity for a social event of participants associated with the project data.

5. The apparatus of claim 1 further comprising logic configured to cause the processing circuit to populate the schedule when the user completes a travel booking operation.

6. A computer-implemented method executed on a processing circuit, comprising:

receiving, via mining an input and an output of a device of a user coupled with one or more networking connections coupled to one or more internal networks and one or more external networks, communications conducted between the device of the user and devices associated with potential candidates, the communications comprising interaction indications between the user and the potential candidates for one or more meetings in a schedule, wherein the interaction indications include:

indirect interactions from communications between the device of the user and external devices communicated on the one or more external networks, and direct interactions from communications between the device of the user and internal devices communicated on the one or more internal networks;

processing the interaction indications to generate relationship data associated with the potential candidates for the one or more meetings in the schedule;

processing project data associated with the potential candidates;

generating, from the relationship data and the project data, graph data comprising a connectivity network having links with the potential candidates, each link of the links corresponding to a relevance value between the user and a specific potential candidate with respect to the project data, and wherein each relevance value represents a relationship between the user and the specific potential candidate;

executing, via an optimization mechanism, a combinatorial optimization technique on the connectivity network and availability data of the potential candidates to determine meeting data comprising an arrangement of meetings for addition to the schedule, the arrangement of meetings being configured to increase relevancy to the user, the availability data being operative to reduce a search space for the arrangement of meetings to open meeting spaces of the user, the graph data of the connectivity network providing a structure for managing the relevance values for the combinatorial optimization technique; and communicating a control directive to an application programming interface (API) of an enterprise application to populate the schedule with the meeting data.

7. The computer-implemented method of claim 6, comprising distributing meeting items onto the open meeting spaces and determining whether the meeting items increase a total relevance value of the schedule.

8. The computer-implemented method of claim 6, comprising updating the connectivity network in response to changes in the relationship data.

9. The computer-implemented method of claim 6, comprising executing the populating step in response to a travel booking operation.

10. The computer-implemented method of claim 6, comprising ranking the potential candidates at a location.

11. The computer-implemented method of claim 6, comprising adjusting the connectivity network based upon the project data, wherein the project data comprises pending project information, project participation information, or a combination thereof stored in a database.

12. At least one non-transitory computer-readable storage medium comprising instructions that, when executed, cause a system to:

receive, via mining an input and an output of a device of a user coupled with one or more networking connections coupled to one or more internal networks and one or more external networks, communications conducted between the device of the user and devices associated with potential candidates, the communications comprising interaction indications between the user and the potential candidates for one or more meetings in a schedule, wherein the interaction indications include:

indirect interactions from communications between the device of the user and external devices communicated on the one or more external networks, and direct interactions from communications between the device of the user and internal devices communicated on the one or more internal networks;

process the interaction indications to generate relationship data associated with potential candidates for the one or more meetings in the schedule;

process project data associated with the potential candidates;

generate, from the relationship data and the project data, a connectivity network in graph data comprising links with the potential candidates, each link of the links corresponding to a relevance value between the user and a specific potential candidate with respect to the project data, and wherein each relevance value represents a relationship between the user and the specific potential candidate;

execute a combinatorial optimization technique on the connectivity network and availability data of the potential candidates to determine meeting data for the schedule comprising an arrangement of meetings to maximize relevancy to the user, the availability data being operative to reduce a search space for the arrangement of meetings to open meeting spaces of both the user and the potential candidates, the graph data of the connectivity network providing a structure for determining the relevancy of the arrangement of meetings via the relevance values; and communicate a control directive to an application programming interface (API) of an enterprise application to populate the schedule with the meeting data.

13. The non-transitory computer-readable storage medium of claim 12, comprising instructions that when executed cause the system to: rank the potential candidates by location or title in an organization.

14. The non-transitory computer-readable storage medium of claim 12, comprising instructions that when executed cause the system to: update the connectivity network in response to changes in the relationship data.

15. The non-transitory computer-readable storage medium of claim 12, comprising instructions that when executed cause the system to: distribute meeting items onto the open meeting spaces and determine whether the meeting items maximize a total relevance value for the schedule.

16. The non-transitory computer-readable storage medium of claim 12, comprising instructions that when executed cause the system to: generate the relationship data based upon social network interactions.

17. The non-transitory computer-readable storage medium of claim 12, comprising instructions that when executed cause the system to: populate the schedule when the user completes a travel booking operation.

* * * * *